Figure 1:
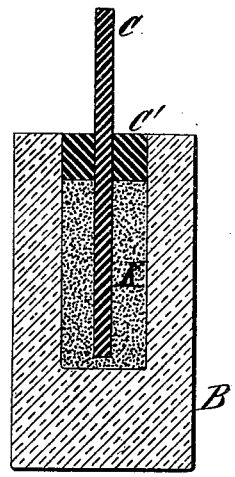

(No Model.)  2 Sheets—Sheet 1.

G. L. LECLANCHÉ.
Galvanic Battery.

No. 234,413.  Patented Nov. 16, 1880.

Witnesses:
Geo. W. Miatt
S. J. Sullivan

Inventor:
Georges Lionel Leclanché
By his Attorney
E. N. Dickerson Jr.

(No Model.) 2 Sheets—Sheet 2.

G. L. LECLANCHÉ.
Galvanic Battery.

No. 234,413. Patented Nov. 16, 1880.

Witnesses:
Geo. W. Miatt
S. F. Sullivan

Inventor:
Georges Lionel Leclanché
By his Attorney
E N Dickerson Jr

UNITED STATES PATENT OFFICE.

GEORGES L. LECLANCHÉ, OF PARIS, FRANCE, ASSIGNOR TO HILBORNE L. ROOSEVELT, OF NEW YORK, N. Y.

GALVANIC BATTERY.

SPECIFICATION forming part of Letters Patent No. 234,413, dated November 16, 1880.

Application filed May 3, 1880. (No model.) Patented in France April 26, 1878.

*To all whom it may concern:*

Be it known that I, GEORGES LIONEL LECLANCHÉ, of the city of Paris and Republic of France, have invented a new and useful Improvement in Electric Batteries, of which the following is a full, true, and exact description, reference being had to the accompanying drawings.

My invention relates to an improvement on the battery well known by my name and heretofore patented to me. In the present battery I dispense with the porous cup and substitute therefor a compressed chemical compound or agglomerate, which possesses strong electro-negative qualities.

My method of forming the electro-negative pole of my battery is as follows: I compound a salt of iron such as the perchloride of iron, preferably slightly decomposed—that is to say, one constituted partly of oxychloride of iron or persulphide of iron, or preferably the double chloride of iron and ammonia. With one of these I mingle the natural or artificial peroxide of manganese, or plumbago, or carbon retort powder, and unite with a sufficient quantity—say about ten per cent.—of some adhesive material, such as rosin, tar, or gum-lac. This compound I then press by hydraulic pressure in molds. The pressure should be at least five-hundred kilograms to one square centimeter.

I sometimes form these improved electro-negative poles with a hollow center by pressing around a mandrel. This hole, so left in the center, I fill either with perchloride or oxychloride of iron and then cover with mixed peroxide of manganese and carbon. I sometimes also introduce into this hollow cylinder a carbon plate and surround it with perchloride of iron, in the manner above described. In compressing these elements I preferably submit them to about 100° centigrade.

I sometimes form my new compound in flat or slightly-hollowed plates and hold them against a carbon conductor. When this is done I prefer that the face of the agglomerate coming against the carbon should be itself composed of carbon powder. These new compounds form excellent poles in combination with an ordinary zinc dipped in an exciting saline solution—such, for instance, as one of salt of ammonia.

It is desirable that the conglomerate bodies have their faces which are to be joined with the carbon slightly concave, so as to allow the circulation of the liquid between the plate of carbon and plumbago and the conglomerate plate or plates which are to be joined to it.

My invention will be readily understood from the accompanying drawings, of which—

Figure 2:
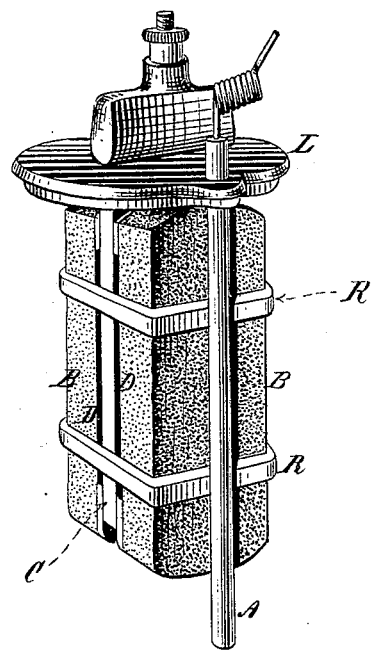

Figure 1 represents a section of my improved conglomerate in connection with a carbon conductor; Fig. 2, a view of my battery without the porous cell, showing separable conglomerate bodies attached to carbon conductors by india-rubber bands, and also the manner of uniting my poles in the supporting-top.

In Fig. 1 B represents the conglomerate mass; K, the perchloride or oxychloride of iron surrounding a conducting-pole, C, which may or may not be used, according to circumstances; C', a compound of carbon powder serving as a plug and surrounding the conducting-pole C.

L, Fig. 2, represents the top or cover of my improved cell, adapted to hold and support the zinc rod A and the electro-negative pole B.

A carbon plate, C, is attached to the cover L in the usual manner, and one, or preferably two, conglomerate bodies, B B, are attached to and held firmly against the plate C by the india-rubber bands R. The portions of the conglomerate plates B B in contact with the carbon plate C are preferably of carbon, as shown. In this way I obtain a perfect electrical conduction.

The zinc rod A is, as will be seen, itself supported by a hole through the cover L, thus forming a compact and readily-removable battery.

A battery so prepared possesses very strong electro-motive force, is readily removed and cleansed, and new conglomerate bodies B may be substituted in a very few seconds for those which may have become worn out.

D represents the openings between the plate C and the conglomerate bodies E for the circulation of the exciting-fluid.

What I claim as my invention, and desire to secure by Letters Patent, is—

1. An electro-negative element composed of a metallic salt, in combination with peroxide of manganese and carbon or plumbago, substantially as described.

2. An electro-negative element formed of a compound of metallic salt with peroxide of manganese and carbon or plumbago, and provided with a central opening containing an additional supply of the metallic salt, substantially as described.

3. An electro-negative element formed of a compound of metallic salt with peroxide of manganese and carbon or plumbago, and provided with a central opening containing an additional supply of the metallic salt and a conducting carbon rod inserted in said metallic salt, substantially as described.

4. The improved electro-negative element shown, which consists of two conglomerate bodies united with and surrounding a central conducting-plate, substantially as described.

5. In an electric battery, the combination of a cover adapted to close the cell containing the exciting-liquid with a zinc pole and an electro-negative pole, which consists of a central carbon plate and two electro-negative conglomerates attached thereto, both of said positive and negative poles being supported by the cover, substantially as shown and described.

6. An electro-negative element, which consists of two electro-negative conglomerates or bodies having a hollow or concave form, and attached to a central conducting-plate, so as to allow of the circulation of the exciting-liquid between the conducting-plate and the electro-negative bodies, substantially as described.

7. The electro-negative pole shown, which consists of one or more electro-negative bodies attached to a conducting-plate by means of an elastic band of india-rubber, thereby allowing the ready substitution of a new electro-negative body for the one which has been injured, and at the same time maintaining a constant and firm contact, substantially as described.

GEORGES LIONEL LECLANCHÉ.

Witnesses:
E. BARBIER,
G. TALOP.